Figure 1:
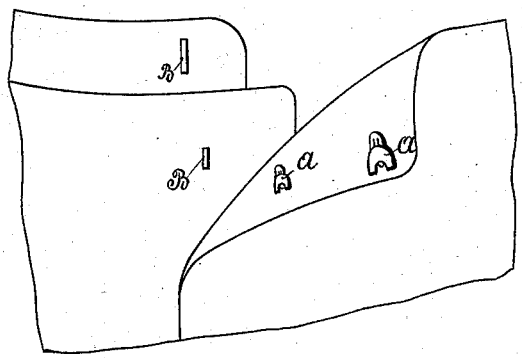

(No Model.) 2 Sheets—Sheet 1.

J. F. SCHOEPPL & W. E. HEEREN.
HOOK AND EYE.

No. 558,115. Patented Apr. 14, 1896.

WITNESSES:
W. E. Elbers
A. M. Wilson

INVENTORS.
Joseph Frank Schoeppl
and William E. Heeren
BY Henry C. Evert
ATTORNEY.

(No Model.) 2 Sheets—Sheet 2.

J. F. SCHOEPPL & W. E. HEEREN.
HOOK AND EYE.

No. 558,115. Patented Apr. 14, 1896.

WITNESSES:
INVENTORS:
ATTORNEY.

UNITED STATES PATENT OFFICE.

JOSEPH F. SCHOEPPL AND WILLIAM E. HEEREN, OF PITTSBURG, PENNSYLVANIA.

HOOK AND EYE.

SPECIFICATION forming part of Letters Patent No. 558,115, dated April 14, 1896.

Application filed June 18, 1895. Serial No. 553,202. (No model.)

*To all whom it may concern:*

Be it known that we, JOSEPH F. SCHOEPPL and WILLIAM E. HEEREN, citizens of the United States of America, residing at Pittsburg, in the county of Allegheny and State of Pennsylvania, have invented certain new and useful Improvements in Hooks and Eyes, of which the following is a specification, reference being had to the accompanying drawings.

This invention relates to certain new and useful improvements in hooks and eyes, and relates more particularly to that class of hook-and-eye connections for garments that may be readily applied without the necessity of stitching.

The invention has for its further object the provision of novel means whereby the hook-and-eye connection when inserted in the garment will clamp the fabric and assume a rigid and fixed relation thereto; furthermore, to so construct the hook-and-eye connection that it will effectually prevent the cloth from becoming worn at the points of insertion of the hook-and-eye connection.

The invention has for its further object the novel construction of a hook-and-eye connection of the above-referred-to class that will obviate the necessity of the use of an instrument or tool to pierce the fabric preparatory to the insertion of the hook and eye; furthermore, forming a gage between the piercing-points that will accurately correspond in width to the distance in which the hook-and-eye connection is to be lodged in the fabric, by this means retaining the cloth in a perfectly smooth condition and prevent the same forming wrinkles that would otherwise be the case; furthermore, to so construct the hook-and-eye connection that it can be removed from its position and replaced as often as desired without the danger of breaking the same; also, to construct the hook and eye in such a manner as to prevent the fabric from raveling at the points of connection of the fabric and the hook and eye.

The invention has for its still further object to construct an eye of this class that when the same is inserted in a garment it will be impossible for the fabric to be moved or displaced laterally along the cross-bar forming the eye proper.

With the above and other objects in view the invention finally consists in the novel construction, combination, and arrangement of parts to be hereinafter more particularly described, and specifically pointed out in the claims.

In describing the invention in detail reference is had to the accompanying drawings, forming a part of this specification, and wherein like letters of reference indicate similar parts throughout the several views, in which—

Figure 2:
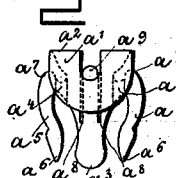
Figure 5:
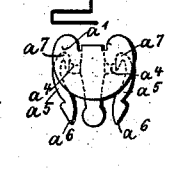
Figure 8:
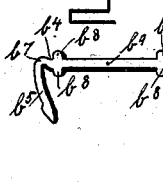
Figure 11:
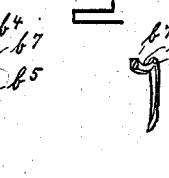
Figure 14:
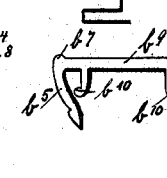
Figure 3:
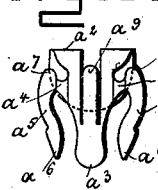
Figure 6:
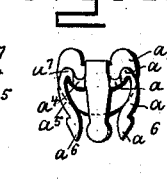
Figure 9:
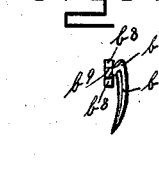
Figure 12:
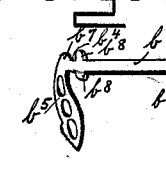
Figure 15:
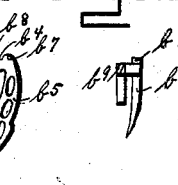
Figure 4:
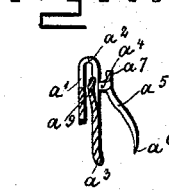
Figure 7:
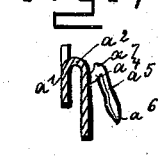
Figure 10:
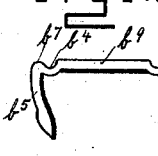
Figure 13:
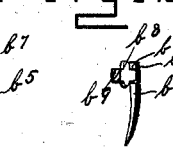
Figure 16:
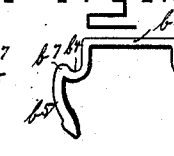
Figure 17:
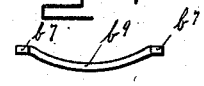
Figure 18:
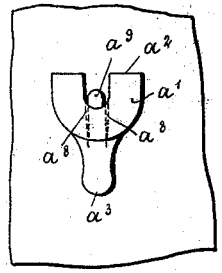
Figure 21:
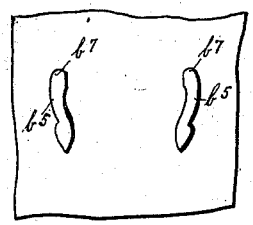
Figure 24:
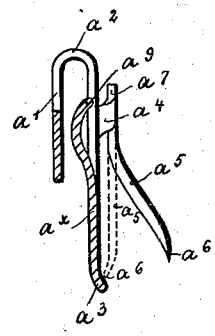
Figure 19:
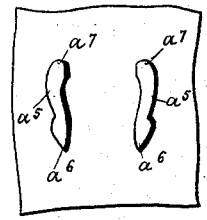
Figure 22:
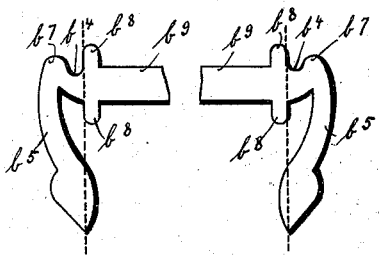
Figure 20:
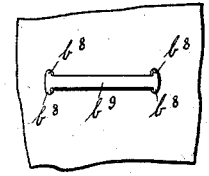
Figure 23:
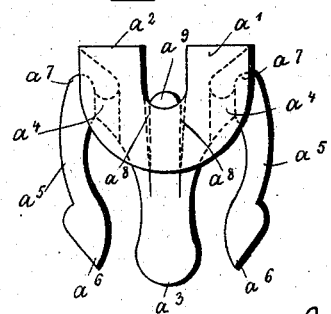

Figure 1 is a view of a portion of a garment with our improved hook-and-eye connection attached thereto. Fig. 2 is a front elevation of the hook connection. Fig. 3 is a rear elevation of the same. Fig. 4 is a vertical sectional view of the hook. Fig. 5 is a front elevation of a modified form of hook. Fig. 6 is a rear elevation of the same. Fig. 7 is a vertical sectional view of the modified form of hook. Fig. 8 is a front view of the eye connection. Fig. 9 is a vertical sectional view of the eye as shown in Fig. 8 of the drawings. Fig. 10 is a front elevation of a modified form of eye connection. Fig. 11 is a vertical sectional view of the modified form of eye connection. Fig. 12 is a front elevation of a preferred form of eye connection. Fig. 13 is a vertical sectional view of the eye connection as shown in Fig. 12 of the drawings. Fig. 14 is a front view of another form of eye connection. Fig. 15 is a vertical sectional view of the same. Fig. 16 is a front elevation of a modified form of eye connection. Fig. 17 is a detail plan view of another form of cross-bar of the eye connection. Fig. 18 is a plan view of the hook connection inserted in position in the fabric. Fig. 19 is a rear view of the same. Fig. 20 is a plan view of the eye connection inserted in the fabric. Fig. 21 is a rear view of the same. Fig. 22 is an enlarged plan view of the eye connection. Fig. 23 is a like view of the hook connection. Fig. 24 is an enlarged vertical sectional view of the hook connection.

Referring to the accompanying drawings by letter, A indicates the hook connection, and B the eye connection. The hook connection A comprises a broad flat hook portion proper, $a'$, the bent or shank portion $a^2$ of which terminates in a forwardly-extending base or clamp member $a^3$, which extends slightly beyond the pointed ends of the wings, as will be hereinafter more particularly pointed out, and shown in Figs. 2 and 3 of the drawings. Near the rear or shank end said extension member $a^3$ has outwardly-projecting portions $a^4 a^4$, the latter being bent slightly downwardly below the plane of the clamp member $a^3$, and are integral with the side wings $a^5$. The latter are of a suitable length and are preferably constructed so as to allow the clamp member $a^3$ to slightly protrude beyond the alinement of the barbed points $a^6$ $a^6$ of the wings $a^5$. The said wings are set so as to converge toward each other at their inner ends, said ends terminating in barbed points $a^6$, as heretofore stated, these points serving to pierce and readily penetrate the fabric. The outer ends of said wings extend beyond the outwardly-projecting portions $a^4$ $a^4$ of the body to form shoulders $a^7 a^7$, which serve to securely embed the wings in the fabric when the latter have been inserted in the fabric.

The extension or clamp member $a^3$ is slit, as shown at $a^8 a^8$, the portion $a^9$ between the slits forming a spring and hump, as clearly illustrated in Fig. 4 of the drawings, the said hump serving to more securely retain the eye within the hook when in engagement therewith, the resiliency of the metal allowing the eye to freely press the said spring forming the hump downwardly as it is passed into engagement with the hook.

The eye connection or member B is similarly provided with projecting portions $b^4$, wings $b^5$, barbed points $b^6$, and shoulders $b^7$. The eye connection is further provided with shoulders $b^8 b^8$, which are integral with the cross-bar $b^9$ of the eye and preferably extend at right angles thereto. Said shoulders may extend above and below the cross-bar, as shown in Fig. 8 of the drawings, or the upper shoulders may be dispensed with and the lower shoulders lengthened, as shown in Fig. 14 of the drawings. In this construction, however, the free ends of the shoulders are bent outwardly, as shown at $b^{10}$. Further modifications of the like principle will be found in Figs. 10 and 16 of the drawings. In the last-referred-to construction the cross-bar is bent in such a manner as to form such shoulders. The shoulders serve to prevent a lateral movement of the fabric toward the center of the cross-bar, and consequently will retain the fabric in the desired position.

It will be seen that the piercing-points of the eye are in perfect vertical alinement with the inner sides of the shoulders, as indicated by dotted lines in Fig. 22 of the drawings, thereby forming an accurate gage as to the distance between which the shoulders are to rest in the fabric and retain the latter in a smooth condition.

If desired, the wings may be provided with eyelets for the purpose of stitching; although, as heretofore stated, this may be dispensed with.

In Fig. 17 of the drawings a curved bar has been shown forming a portion of the eye connection, this special form being preferably employed in case it is desired to place the eye connection at the end of the fabric. The curved bar will then slightly protrude beyond the edge of the garment. The advantages gained by this construction will be apparent. What has heretofore been stated in reference to the gage of the eye connection also applies to the hook connection, which also forms a gage and operates likewise.

The clamp member $a^3$ extending slightly beyond the pointed ends of the wings will prevent the points wearing through the garment. The blunt free end of the clamp member will take up the friction and serve to guard the garment from the points of the wings.

The above-described device may be made of any suitable material, but is preferably stamped out of metal, although the article may be advantageously formed of wire of suitable thickness.

It will be seen that the clamp $a^3$ gradually slopes from the body portion, thereby adding strength and durability to the device. Furthermore, it adds to the general appearance of the article.

As shown in Fig. 1 of the drawings, our invention is applied to men's trousers, showing only one form of application. The device may be used in lieu of all buttons and other forms of hook-and-eye connections. Furthermore, the construction shown in Fig. 5 of the drawings may be used in place of suspender-buttons, and in this capacity affording a special advantage, inasmuch as the great strain to which this class of buttons is subjected will cause the same to become loose and detached, this objectionable feature being easily overcome by the use of our improved hook.

Attention is directed to the fact that the clamp member $a^3$ is slightly bent concavo-convex, as shown at $a^\times$ in Fig. 4 of the drawings, and the wings $a^5$ are bent in the oppositely-inclined direction, thus forming a more desirable clamp and securing-point when the aforesaid parts are pressed together when inserted in proper position in the fabric.

The hook-and-eye connection is applied to the garment as follows: The wings of the hook connection are forced into the fabric through the medium of the piercing-points, the fabric being placed between the shoulders and the body portion of the hook. The clamp member extending over the face of the fabric thus forms a clamp between the wings and the clamp member. These portions, being curved in opposite directions, may be slightly pressed together and the fabric will be held in the desired position. The points of the wings will form the exact gage for the distance between the points at which the hook member is to be lodged in the fabric. As the hook is inserted in the fabric the same will slightly turn at the points of insertion, thus preventing ruffling of the cloth. Furthermore, the hook may be removed any number of times and the wings will not break or become damaged. The eye connection is placed in the fabric in a similar manner to that of the hook connection, the additional shoulders serving to prevent lateral displacement of the fabric along the cross-bar of the eye proper. The barb or arrow-head formed on the piercing-point of the hook-and-eye connection will serve to pierce the hole of insertion for the hook-and-eye connection large enough so as to conform with the width of the device at the points where the same is lodged within the fabric.

It will be noted that various changes may be made in the details of construction and arrangement of parts without departing from the general spirit of our invention.

Having fully described our invention, what we claim as new, and desire to secure by Letters Patent, is—

1. A hook-and-eye connecting device formed of a body portion having a hook member extending from one side thereof, wings projecting from the ends and a clamp member extending centrally from the body portion between and slightly beyond said wings, substantially as described.

2. A hook-and-eye connecting device formed of a body portion having a hook member extending from one side thereof, wings on the body and a clamp, the said wings and clamp being oppositely curved, for the purpose described.

3. An eye connecting device provided with wings, a cross-bar connecting the wings and means on the cross-bar for preventing lateral movement of fabric.

4. An eye connecting device having a cross-bar carrying wings converging toward each other, in combination with shoulders arranged on the cross-bar near said wings, substantially as described.

5. An eye connecting device provided with extended wings and shoulders arranged on the cross-bar, substantially as described.

6. An eye connection having shoulders extending above and below the cross-bar, in combination with downwardly-extending wings substantially as described.

7. An eye connecting device having a cross-bar carrying extended wings converging toward each other, and shoulders upon said cross-bar adapted to retain the fabric in position, substantially as described.

In testimony whereof we affix our signatures in presence of two witnesses.

JOSEPH F. SCHOEPPL.
WILLIAM E. HEEREN.

Witnesses:
H. C. EVERT,
H. E. SEIBERT.